United States Patent
Kubbutat

[11] Patent Number: 4,919,866
[45] Date of Patent: Apr. 24, 1990

[54] MANUFACTURE OF LIGHTWEIGHT STRUCTURAL ELEMENTS

[75] Inventor: Albert F. Kubbutat, Wihislingen, Fed. Rep. of Germany

[73] Assignee: Sto Aktiengesellschaft, Stuhlingen, Fed. Rep. of Germany

[21] Appl. No.: 190,650

[22] Filed: May 5, 1988

[30] Foreign Application Priority Data

May 9, 1987 [DE] Fed. Rep. of Germany ....... 3715487

[51] Int. Cl.$^5$ .................... B29C 67/20; B29C 67/24
[52] U.S. Cl. .................... 264/45.3; 264/259; 264/DIG. 6
[58] Field of Search ............... 264/DIG. 6, 45.3, 259

[56] References Cited

U.S. PATENT DOCUMENTS

| | | | |
|---|---|---|---|
| 3,541,194 | 11/1970 | Resnick | 264/DIG. 6 |
| 3,585,157 | 6/1971 | Beck | |
| 3,764,247 | 10/1973 | Garrett et al. | 264/DIG. 6 |
| 4,086,098 | 4/1978 | Le Ruyet et al. | 106/97 |
| 4,560,523 | 12/1985 | Plumley et al. | 264/DIG. 6 |

FOREIGN PATENT DOCUMENTS

| | | |
|---|---|---|
| 66172 | 12/1982 | European Pat. Off. |
| 1669610 | 3/1971 | Fed. Rep. of Germany |
| 2651699 | 5/1977 | Fed. Rep. of Germany |

*Primary Examiner*—Jeffery Thurlow
*Assistant Examiner*—Leo B. Tentoni
*Attorney, Agent, or Firm*—Pascal & Associates

[57] ABSTRACT

A method for manufacturing lightweight structural elements, for example, in form of plates which, at low density, have high mechanical strength and good insulating properties, wherein 70-95 parts by weight of open porous blown glass spheres have a grain fraction of 0.2 to 20 mm and a gross density between 0.2 and 0.55 g/cm$^3$ are mixed with 4-30 parts by weight of an epoxy binder. The epoxy binder consists of a bisphenolic resin, to which 0.5-5 parts by weight of a polysiloxane are added, and an amine hardner. The blown glass spheres are thereby wetted on their surfaces. They are poured into a mold corresponding to the shape of the lightweight structural element, after which heat is added, as a result of which the amine hardener reacts with the polysiloxane and epoxy resin and an epoxy foam results between the blown glass spheres.

10 Claims, 1 Drawing Sheet

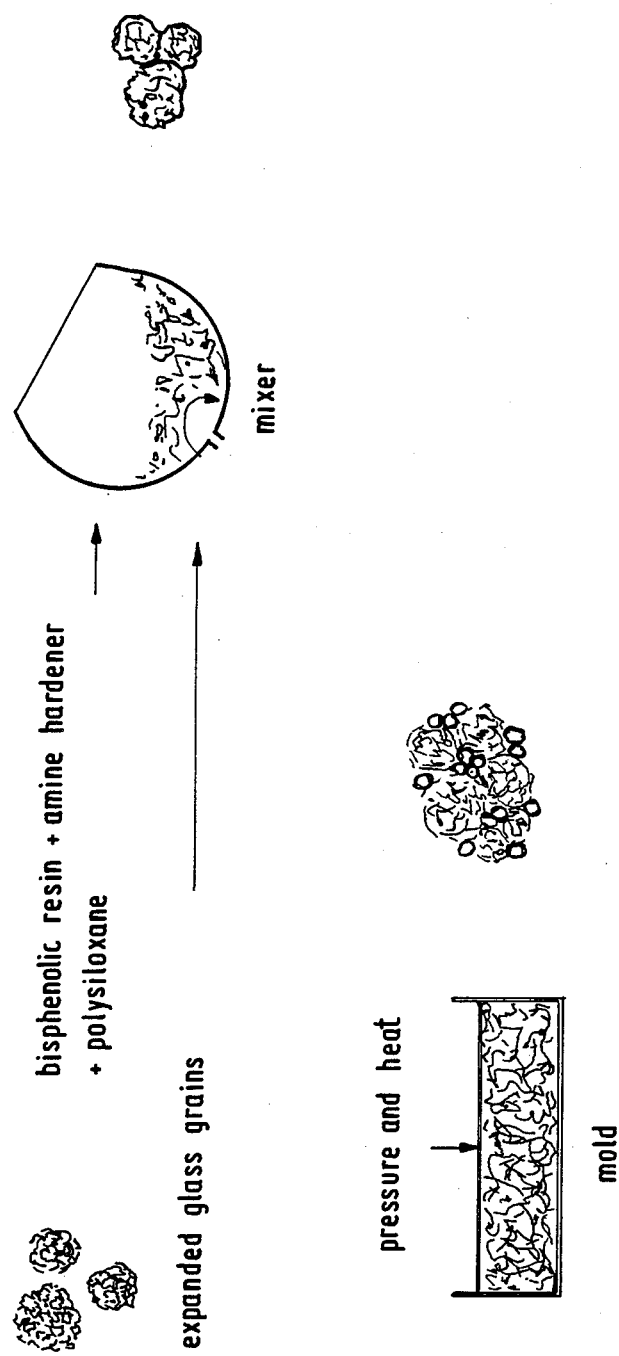

MANUFACTURE OF LIGHTWEIGHT STRUCTURAL ELEMENTS

The invention relates to a method for manufacturing lightweight structural elements using blown glass spheres and a foamed organic binder.

Prior Art

European Patent EP-A 00 66 172 describes lightweight structural elements which consist, among other things, of expanded minerals and a binder. The binder is processed in a foamed form, whereby foaming takes place by means of a surface-active agent, e.g. by means of soap. Foaming takes place in the presence of water, so that the binder must be dispersible in water or, at least, emulsifiable in water. Among other things, epoxy resin is mentioned as a binder. However, the presence of water in the manufacture of lightweight structural elements is undesirable, since it is unavoidable that a part of the water remains trapped in the lightweight structural element.

U.S. Patent U.S.-A No. 35 85 157 describes structural elements which consist of a binder, e.g. epoxy resin, small glass spheres and, in addition, larger spheres of expanded polystyrene. In this case, the required high binder content and the inflammability of the product are disadvantageous.

In the journal "Kunststoff-Berater" [Plastics Adviser], 8/1972, pages 613 to 618, the manufacture of structural parts made from a resin-foam glass paste, which contains glass fibres and fine glass beads, is described. In this case also, the resin content is relatively high.

The material according to German Patent DE-A 26 51 699 consists of fine cellular glass beads, larger cell-free glass beads and a binder, e.g. epoxy resin. The material is difficult to manufacture and has a high binder content.

The lightweight structural plates according to German Patent DE-U 19 18 406 consists of expanded minerals and a binder which hardens in a foamed state, e.g. water glass.

The lightweight structural elements, which are produced according to German Patent DE-A 16 69 610, consist of blown glass and an organic hard foam as, for example, polyurethane foam. The blown glass should have a closed surface. When the blown glass is mixed with the polyurethane, the latter should be pre-foamed. These lightweight structural elements also have a high binder content and, moreover, have the disadvantage that the polyurethane foam is flammable.

German Patent DE-U 19 13 069 describes a lightweight structural element consisting of foamed polyurethane and foam glass beads, which should also have a glazed surface.

It can be seen, in particular, in the last two patents that the blown glass serves primarily as a filler for expanded plastics. The surface of the blown glass beads should, to a great extent, be non-porous since one proceeded from the assumption that the blown glass beads would be impregnated with the binder.

DESCRIPTION OF THE INVENTION

It is the object of the invention to manufacture lightweight structural elements as plate or profile parts which have a high mechanical strength at low density, which are fireproof as well as soundproof and heat insulated and which require a minimum binder content for their manufacture.

Blown glass beads, which have open pores on their surface, yet closed pores on the inside, are used in the manufacture. Preferably, these are made from old glass which is ground to powder. This powder is mixed with mineral aggregates and water glass and subjected to very high temperatures in an oven. The above-noted blown glass beads are formed in this way. The blown glass has the following grain fractions in mm, bulk densities A in Kg/m$^3$ and gross densities B in g/cm$^3$:

| Fraction | A | B |
|---|---|---|
| 10–20 | 150 ± 25 | 0.20–0.30 |
| 4–10 | 175 ± 25 | 0.25–0.35 |
| 2–4 | 200 ± 25 | 0.30–0.40 |
| 1–2 | 225 ± 25 | 0.35–0.45 |
| 0.5–1 | 275 ± 25 | 0.40–0.50 |
| 0.2–0.5 | 375 ± 25 | 0.45–0.55 |

Moreover, an epoxy binder and a polysiloxane are used. The epoxy binder consists of two components, namely, of a bisphenolic A resin as a first component, e.g. LY 5054 of Ciba-Geigy, and of an amine hardener as a second component, for example, HY 5054 of Ciba-Geigy. The polysiloxane is a propellant which is added to the first component.

The blown glass spheres, the bisphenolic resin mixed with the polysiloxane and the amine hardener are put in a mixer and hereby homogenized. As a result, the blown glass spheres are wetted on their surface with the resin, the hardener and the siloxane. However, these liquids do not penetrate into the bores on the surface of the blown glass beads.

After a mold, which corresponds to the shape of the lightweight structural element to be manufactured, has been filled, heat is added. In this case, two reactions occur, namely, the liberation of the propellant gas hydrogen from the propellant, called Reaction I in the following, and subsequently the hardening reaction, called Reaction II in the following.

Reaction I:

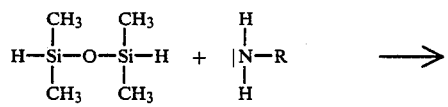

Propellant        Amine Hardener

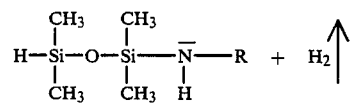

Propellant Gas

Reaction II:

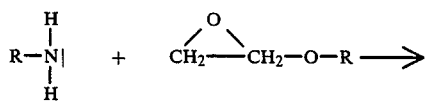

Amine Hardener        Epoxy Resin

-continued

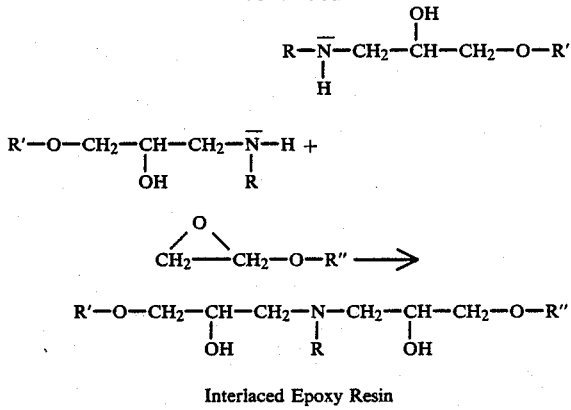

Interlaced Epoxy Resin

The interlaced epoxy resin is hereby foamed up and fills up the voids between the blown material beads without penetrating into the pores of the blown glass surface, which is prevented by the expansion pressure when the propellent gas forms. This is in contrast to a non-foaming liquid resin system in which a part of the matrix material is absorbed by the blown glass beads and this part does not, therefore, contribute to the binding of the beads and in which the binding between the blown glass beads takes place in a punctiform manner. As a result of the foaming, the blown glass beads are completely surrounded by the foam and the introduction of force takes place in the loading case over the entire sphere surface and not over individual points. In contrast to a liquid resin system without foaming, the preceding has the advantage of a low binder content with a higher strength of the final product.

EMBODIMENTS OF THE INVENTION

Preferably, 40 parts by weight hardener are used for 100 parts by weight resin.

The basic fractions of the blown glass are in equal parts 0.2 to 0.5 mm and 0.5 to 1 mm. Depending on the thickness of the lightweight structural element, the coarser fractions are added. If structural parts with good insulating properties are to be manufactured, then the coarse fractions are preponderant, whereby the content of the epoxy binder can be at the lower limit of the range 4–30 parts by weight of bisphenolic resin and an amine hardener. If profile parts are to be manufactured, then blown glass spheres of the fine fraction are primarily used, whereby the content of the epoxy binder is at the upper limit of that noted above. However, this can be reduced further, as will be explained later.

The addition of heat takes place at approximately 100° C. over a period of about 10 minutes. Preferably, a pressure of 0.5 N/mm² (or up to 1 N/mm²) is simultaneously externally applied. In order to reduce the content of the epoxy binder which is at the noted upper limit, when manufacturing profile parts, this pressure is increased so that a binder content is required which is 40% below the upper limit noted above. When the blown glass spheres are mixed with the resin, hardener and siloxane, a silicon based surface-active substance can be additionally added. To increase the flame retardant effect it is, moreover, possible to add to the mixture, individually or in combination, mineral fillers based on calcium carbonate, aluminum hydroxide, aluminum silicate or quartz prior to the step of adding heat. Due to the high specific surface of these mineral fillers, an epoxy binder content is then required which is at the upper limit of the range noted above.

Moreover, it is possible to add mineral, glass or plastic (synthetic) fibres starting at a length of 3 mm and mixed individually or in combination to the mixture prior to the step of adding heat, which contribute to the mechanical strength since they are embedded in the plastic foam.

70–95 parts by weight open porous blown glass spheres of the grain fraction 0.2 to 20 mm and a gross density of between 0.2 and 0.55 g/cm³ are used. These are mixed with 4–30 parts by weight of an epoxy binder, consisting of bisphenolic resin and an amine hardener, whereby 0.5–5 parts by weight of a polysiloxane are added to the bisphenolic resin. The ratio of resin to hardener is approximately 100:40. The addition of a silicon based surface-active substance is up to 1 part by weight. Mineral fillers can be added up to 100 parts by weight and fibres up to 100 parts by weight.

To manufacture a carrier plate, 1000 parts by weight blown glass spheres, 197 parts by weight resin, 3 parts by weight siloxane, 80 parts by weight amine hardener, 500 parts by weight aluminum hydroxide and 20 parts by weight glass fibres are, for example, used. These are homogenized in a ribbon blender and subsequently molded to a carrier plate at 100° C. and at a pressure of 0.5 N/mm² for about 10 minutes.

If plates are manufactured according to this method, then these can, depending on the purpose, be coated with thin layers of glass cloth, natural stone, aluminum foil or aluminum sheet, glass or plastic in the form of thin plates or foils to form a decorative layer.

I claim:

1. A method for manufacturing lightweight structural elements using blown glass spheres and a foamed organic binder, in which the blown glass spheres are mixed with the binder, which foams up and hardens and thus forms a matrix, comprising the steps of mixing
   (a) 70–95 parts by weight open porous blown glass spheres having a grain fraction of 0.2 to 20 mm and a gross density between 0.2 and 0.55 g/c³,
   (b) 4–30 parts by weight of a liquid epoxy binder consisting of bisphenolic resin and an amine hardener, and
   (c) 0.5–5 parts by weight of a liquid polysiloxane
   to wet the surface of the blown glass spheres,
   pouring the mixture into a mold corresponding to the shape of the lightweight structural element, and adding heat,
   whereby a reaction of the amine hardener with the polysiloxane and with the epoxy resin occurs to form a foam structure of the binder in voids between and surrounding the blown glass spheres.

2. A method according to claim 1, including the step of mixing up to one part by weight of a silicon based surface-active substance to the mixture prior to the step of adding heat.

3. A method according to claim 1 in which up to 100 parts by weight of a mineral filler based on at least one of calcium carbonate, aluminum hydroxide, aluminum silicate and quartz is added and mixed to the mixture prior to the step of adding heat.

4. A method according to claim 1, in which up to 10 parts by weight of at least one of mineral, glass and synthetic fibres from 3 mm in length are added and mixed to the mixture prior to the step of adding heat.

5. A method according to claim 1, in which the addition of heat is effected at approximately 100° C. over a period of about 10 minutes.

6. A method according to claim 1, in which when the heat is added, a pressure of up to about 1 N/mm² is simultaneously externally applied.

7. A method according to one of claims 1 to 6, in which the glass spheres are primarily blown glass spheres of coarse fraction, and the epoxy binder content is about 4 parts by weight, to form elements in the form of plates having good insulating properties.

8. A method according to one of the claims 1 to 6, in which a decorative layer is applied to at least one side of the element.

9. A method according to claim 8, in which the decorative layer is comprised of one of glass cloth, natural stone, aluminum foil or aluminum sheet and glass or plastic in the form of a thin plate or foil.

10. A method as defined in one of claims 1–6, in which the glass spheres are primarily blown glass spheres of fine fraction and the epoxy binder content is about 30 parts per weight, to form elements for profile parts.

* * * * *